United States Patent [19]

Mitsuka et al.

[11] Patent Number: 4,687,944

[45] Date of Patent: Aug. 18, 1987

[54] METHOD FOR CONTROLLING MAGNIFICATION VARIATION

[75] Inventors: Ikuo Mitsuka; Akira Kuwabara, both of Kusatsu, Japan

[73] Assignee: Dainippon Screen Mfg. Co., Ltd., Kyoto, Japan

[21] Appl. No.: 760,751

[22] Filed: Jul. 30, 1985

[30] Foreign Application Priority Data

Aug. 29, 1984 [JP] Japan ............................. 59-178286

[51] Int. Cl.⁴ .......................................... H04N 1/024
[52] U.S. Cl. .................................... 250/578; 358/293
[58] Field of Search ................. 250/578; 358/293, 213

[56] References Cited

U.S. PATENT DOCUMENTS 4,149,091 4/1979 Crean et al. ......................... 358/293
4,591,727 5/1986 Gaebelein et al. .................. 358/213

Primary Examiner—Edward P. Westin
Assistant Examiner—Charles Wieland
Attorney, Agent, or Firm—Zarley, McKee, Thomte, Voorhees & Sease

[57] ABSTRACT

In a method for controlling magnification variation in which an original picture image is projected on a light receiving surface with a desired magnification, the projected picture image is moved in the sub-scanning direction which intersects the main scanning direction where the sensor is aligned, and the feeding speed (V) in the sub-scanning direction and the electric charge storage time are controlled.

7 Claims, 4 Drawing Figures

METHOD FOR CONTROLLING MAGNIFICATION VARIATION

BACKGROUND OF THE INVENTION

The present invention relates to a method for controlling magnification variation widely and minutely for use in a picture image inputting apparatus in which one dimensional array sensor such as CCD etc. are used.

PRIOR ART

Conventionally, in the picture image inputting apparatus in which one dimensional array sensor such as CCD etc. are used, photographing magnification is fixed, and it has been general to obtain an output picture image size or a reproduced picture image size having a constant magnification, however, for example, as disclosed in the Japanese Patent Laid-Open Publication No. 58-139139, a method in which one dimensional array sensor is moved in the sub-scanning direction mechanically in the inside of a camera, picture image signals are read out, and variation in photographing magnification is to be carried out only by optical means has been already known, and apparatus for practicing the method has been known as a compact one.

However, the method disclosed in the above described Japanese Patent Laid-Open Publication No. 58-139139 there are necessities for sufficiently correct two dimensional distortions of the optical system (lens, illumination etc.) and inexactness in diameter not only in the main scanning direction, but also in the sub-scanning direction. For this reason, in some usages which require higher picture image processings, for example, when it is applied to the technical fields such as printing, plate-making etc., and for minimizing deterioration of quality of reproduced pictures, a method which can suppress the two dimensional distortions in one dimensional direction, that is, a method for performing sub-scanning by moving the original picture or the CCD camera etc. is desirable. However, in the case of exact trimming of the original picture being required and a wide and minute variable magnification range being required, in the sub-scanning mechanism there are necessities of being provided with preciseness and, as will be described hereinafter, control over a wide range of speed, i.e. speed control from low speed to high speed, especially, it has been difficult in realizing a mechanism which can move the sub-scanning mechanism with high speed.

SUMMARY OF THE INVENTION

It is an object of the present invention to solve the above described disadvantages and to provide a method for obtaining an output picture image (reproduced picture image) varied in its magnification and having desired picture quality.

The present invention has a relationship with an arranging direction of CCD one dimensional array sensor, i.e., with a magnification in the main scanning direction, but has not any relation with magnification in the sub-scanning direction. Accordingly, decision of magnification in the sub-scanning direction is mainly based steps described in the following three items, that is;

(1) varying magnification by changing speed in the sub-scanning direction and electric charge storage time in CCD;

(2) in the case of sub-scanning speed being unable to change or there being only a step-wise speed variable mechanism provided, varying magnification mainly by changing electric charge storage time in CCD; and (3) in the case of electric charge storage time being unable to change (for example, out of variable range of the electric charge storage time or the circuit being a step-wise variable circuit), varying magnification by changing mainly sub-scanning speed. thus, over a wide range with minute variable magnification can be obtained.

BRIEF DESCRIPTION OF THE DRAWINGS

In FIGS. 3$a$ and 3$b$ there are shown illustration views of a photographing image means of a picture image reproducing system to which the method of the present invention is applied.

Figure 3A:
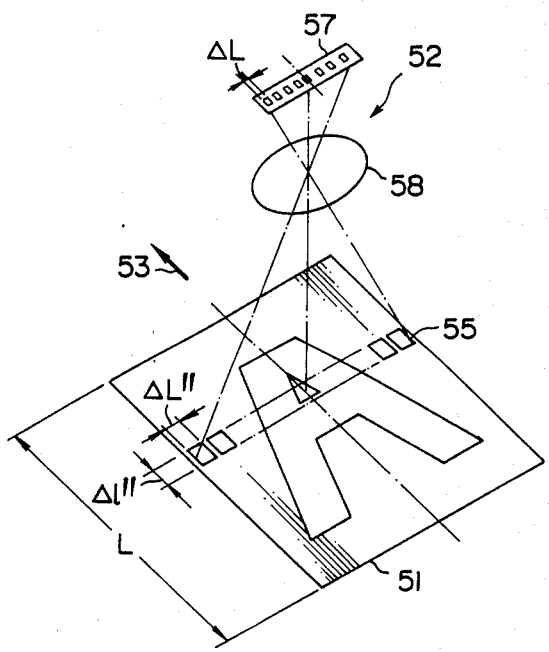
FIG. 3 ($a$ and $b$) are views showing background of the present invention.
Figure 3B:
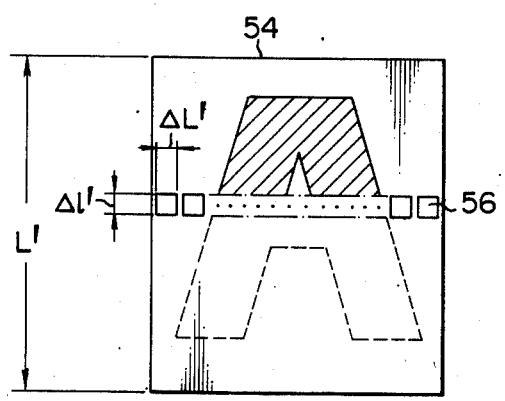

In the photographing means shown in FIG. 3$a$, an original picture (51) or a camera part (52) is moved in the sub-scanning direction (53) for scanning, while simultaneously conducting scanning in the main scanning direction by the CCD elements of the camera part (52), and from picture signals obtained by the above scanning operation, with a recording means separately provided, a reproduction picture (54) is obtained. A method for varying magnification in this case is described hereinafter.

At first, it is determined with what extent of minuteness ($\Delta''$) a picture element (55) to be read out from the original picture (51) should be separated and with what extent of minuteness ($\Delta'$) a recording picture element (56) should be reproduced. Then, size of desired reproduced picture to the original picture is set as that of shown in FIG. 3$b$. In this case if length of one side of the original is L and if length of the corresponding side of the reproduced picture is set to be (L'), L/L' (length of original picture/length of reproduced picture) becomes an inverse ratio of magnification M, that is, $L/L' = 1/M$ .... (1)

Sub-scanning is carried out by relative movement between the original picture and the camera part, and the movement is substantially continued and of which speed is set to V.

Basing upon the above described conditions, if reading out of the original picture is conducted with a width of $\Delta L''$ and time $\tau$ (electric charge storage time in CCD), the sub-scanning speed (V) can be represented as $V = \Delta L''/\tau$ .... (2).

Further, since $L/L' = \Delta L''/\Delta L'$ .... (3), $\Delta L'' = L/L' \times \Delta L'$, accordingly, $V = L/L' \cdot \Delta L'/\tau$ .... (4) $1/M = V \cdot \tau/\Delta L'$ .... (5). Therefore, when length of the side ($\Delta L'$) of the recording picture element (56) which determines resolving power in the sub-scanning direction is fixed, the following relation, $M \alpha 1/V \cdot \tau$ is generated. That is, magnification M is inversely proportional to the product of the moving speed of the original picture (V) and electric charge storage time ($\tau$).

Basing on the above described prepositions, descriptions will be given regarding further concrete example.

In the case of using a stepping motor and a feeding screw for sub-scanning the original picture (51) shown in FIG. 3, if positioning at the original picture side for trimming is expected to be performed with an exactness of an extent of about 10 μm, and then the stepping motor and the feeding screw are set up so that with one step of the stepping motor the feeding screw may be moved by 5 μm, and the highest driving frequency is set to be 10 kpps.

On the other hand the CCD is used as one dimensional array sensor and its electric charge storage time (main scanning time) is set up, for example, to $\tau = 1$ mm second. In addition, length of one side in the sub-scanning direction of the recording picture element (56) of the reproduced picture is set to $\Delta L' = 50$ μm. Then, from the afore-mentioned conditions the minimum value of magnification (M)(i.e., to what extent L' can be reduced comparing with L) can be obtained from the formula (5), that is, $$1/M_{MIN} = (L/L'_{MAX}) =$$

$$\frac{10 \times 10^3 \times 5 \times 10^{-6} \times 1 \times 10^{-2}}{5.0 \times 10^{-6}} = 1$$

In addition, it is needless to say regarding magnification variable range, also the driving frequency of the stepping motor is digitally set up, for example, by a designation value of some 8 bits, magnification can be varied only 256 steps, which results in being unable of minute setting up of magnification.

In the sub-scanning mechanism there is a restriction regarding variable range of magnification, as mentioned above, and if variable magnification control is carried out only by changing sub-scanning speed, the variable range becomes narrower and usages thereof are limited to small fields.

On the other hand, variable range of the electric charge storage time ($\tau$) of CCD is between 0.1 mm second and several tens mm seconds, because of CCD having dark output, for example, in TCD 101AC made by KABUSHIKI KAISHA TOSHIBA, when sufficiently wide signal range is set, its electric charge storage time is lower than several tens second, and because of lowering light receiving sensitivity caused by restriction from an intensity of a light source, the charge storage time ($\tau$) must be longer than 0.1 mm second.

The method according to the present invention is characterized in varying photographing magnification by combining sub-scanning speed (V) with the electric charge storage time (main scanning time $= \tau$) of CCD and controlling them complementarily not merely by controlling the sub-scanning speed (V). For example, in the afore-mentioned case, to obtain (L/L')=5 (a reproduced picture of reduced scale 1/5), from the formula (5) the following condition, $\tau = 5$ mm sec., is sufficient.

Further, in order to set up magnification in the main scanning direction optical magnification ($\beta$) basing on a lens (58) and other methods (for example, increasing, trimming etc. which will be hereinafter) are used at the same time. However, in the case of there occurring necessity of setting up by what extent of minuteness ($\Delta L''$) the original picture to be read out should be analyzed, there are relationships as described the following formulas, that is, $\beta = \Delta L''/\Delta L$, $L/L' = \Delta L''/\Delta L' = \Delta L''/\Delta L'$;

here, an arranged pitch between each of light receiving cells of the one dimensional array sensor is $\Delta L$, and each pitch of picture elements of both the original picture and the reproduced picture in the main scanning direction is $\Delta L''$ and $\Delta L'$, respectively.

DESCRIPTION OF THE PREFERRED EMBODIMENT

Figure 1:
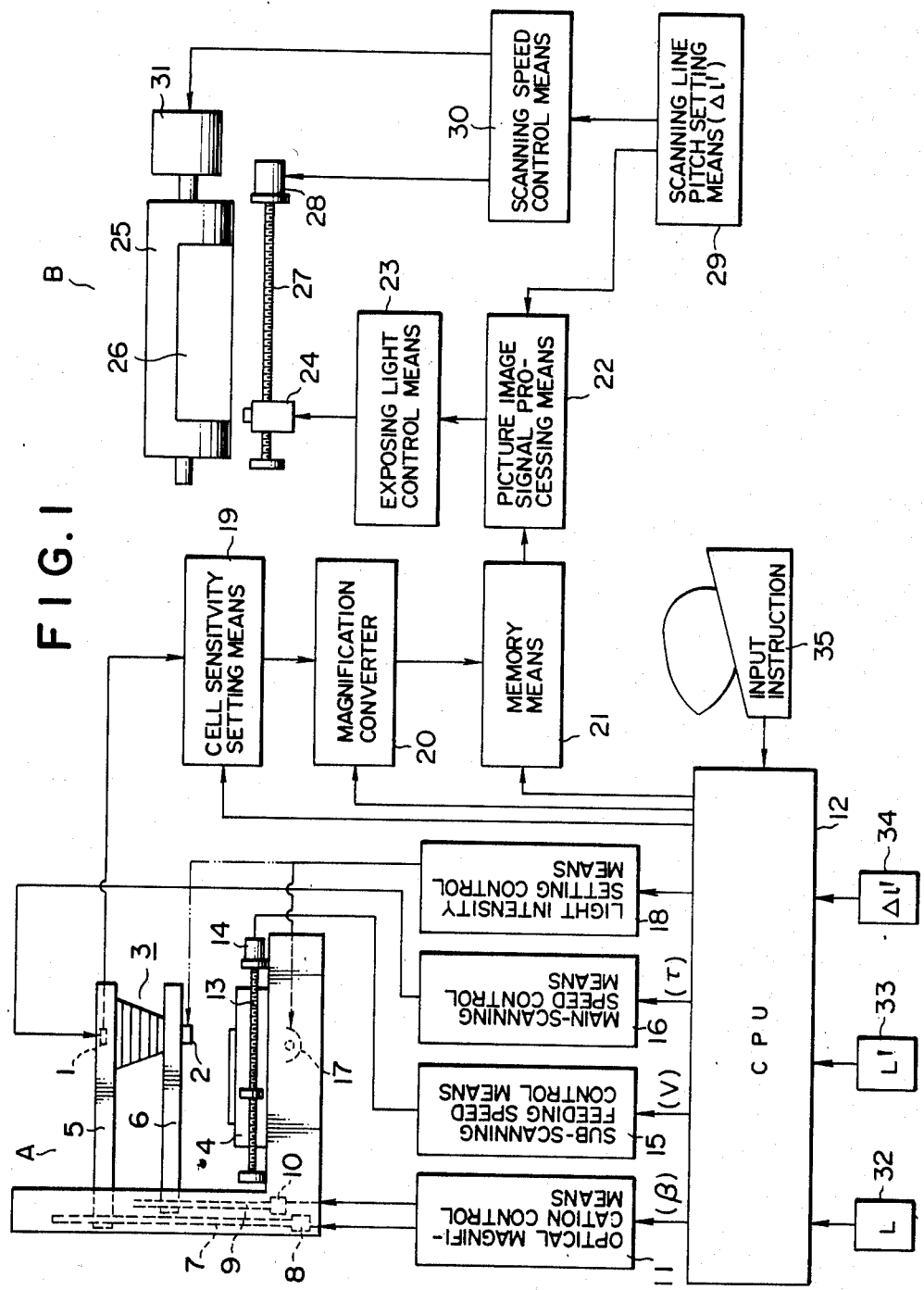
FIG. 1 is a block diagram of an original picture reproducing system to which the method of the present invention is applied.

FIG. 1 is a block diagram showing an embodiment of a picture image reproducing system to which the method of the present invention is applied, and this system comprises an original picture scanning means (A) controlled by the method of the present invention and a picture scanning recording means (B) which uses a picture image recording part such as the conventional color scanner or the like.

The original picture scanning means (A) comprises an electronic camera (3) for main scanning having an one dimensional array sensor (1) (for example, CCD) and a lens (2), a table (4) for feeding the original picture in the direction of the cells of the sensor (1) being arranged, i.e., the sub-scanning direction which intersects the main scanning direction at right angles.

In order to freely vary freely the optical magnification ($\beta$) in the direction of the cells being arranged, the electronic camera (3) is adapted to freely set up distance between a camera frame (5) on which the sensor (1) is provided and the upper surface of the table (4), and distance between a lens frame (6) on which the lens (2) is being mounted and the upper surface of the table (4). The camera frame (5) is driven and controlled according to a desired optical magnification ($\beta$) given from a CPU (12) by basing on an optical magnification controlling means (11) and by applying an automatic focusing optical magnification setting method with the feeding screw (7) and the motor (8). Quite same as the described the above, the lens frame (6) is also driven and controlled with the feeding screw (9) and the motor (8). (For example, refer to the Japanese Patent Publication No. 57-13859).

The feeding table (4) is driven and controlled by a feeding screw (13) and a motor (14) according to a desired value of feeding speed (V) given from the CPU through a sub-scanning feeding speed control means (15). In the sensor (1), through a main scanning speed control means (16), according to a value of desired main scanning time ($\tau$) given from the CPU (12), time for one main scanning line, that is, the electric charge storage time ($\tau$) is controlled.

On the optical axis of the lens (2) at the underside of the feeding table (4) there is provided a light source (17) for illuminating the original picture, and quantity of light of the light source (17) is set up, by a light quantity setting means (18), according to the optical magnification ($\beta$) given to the CPU (12) and each of values of the scanning time ($\tau$) of the sensor (1) prior to scanning of the original picture. In addition, the light quantity setting means (18) may control value of diaphragm of the lens (2) according to the optical magnification ($\beta$) and the scanning time ($\tau$), and it may also control light quantity of a desired part by associating a light quantity of the light source (17) with a value of diaphragm of the lens (2). At any rate it is desired that the standard of lightness of a light image produced on the surface of the sensor (1) may be substantially constant.

Picture image signals output from the sensor (1) are input to a cell sensitivity setting means (19), and the cell sensitivity setting means (19) is adjusted previously as follows. For example, prior to scanning the original picture, white level corresponding to the highlight setup point is received by all the cells, and then the cell sensitivity setting means (19) adjusts a sensitivity correcting value so that an output of said white level at every cell may be constant. (For example, refer to the Japanese Patent Application No. 59-35336). The invention disclosed in the application can corrects optical two dimensional distortion etc. Further, when the cell sensitivity setting means (19) is being set up, main scanning operation of the sensor (1) is controlled with the electric charge storage time ($\tau$) which is equal value to the main scanning time($\tau$) decided according to a magnification which will be described hereinafter.

The picture signal output from the cell sensitivity setting means (19) inputs to an electronic magnification converter (20) and this electronic magnification converter (20) increases normal picture element signals obtained by the sensor (1) by doubling the same picture element with a desired interval or trims normal picture element signals with a desired interval. Thus, by modifying the number of picture elements of a reproduced picture to that of the normal picture elements of the original picture, enlargement and/or reduction of the reproduced picture is achieved electronically. (For example, refer to Japanese Patent Laid-Open Publication No. 53-11601, Japanese Patent Laid-Open Publication No. 54-35613 and Japanese Patent Laid-Open Publication No. 54-65601).

In addition, the electronic magnification converter (20) can increase and/or trim the number of picture elements both in the main scanning and the sub-scanning directions. In those cases, setup conditions established prior to scanning the original picture, such as the limit of the amount of increasing or trimming, and determining which scanning directions should be taken etc. are input to the CPU (12), and are set up to be standards for decision.

Magnification variation in the main scanning direction is mainly carried out by the optical magnification control means (11), and magnification variation exceeding the range of control is performed, as afore-mentioned, by increasing or trimming the picture elements.

The picture signals processed by the magnification converter (20) are applied to a picture signal memory means (21) to store once the whole original picture elements information therein, and then they are appropriately read out and fed to a picture recording apparatus (b). In addition, for processing the information in real time, the original picture elements information is fed to the memory means (21) which has memory capacity capable of storing original picture elements information of a quantity per at least one main scanning (pulses necessary for synchronization from the CPU are fed to the pulse motor (14) through the sub-scanning feeding speed control means (15), fed to the CCD (1) through the main scanning speed control means (16), and then fed to the cell sensitivity setting means (19), to the magnification converter (20) and the memory means (21).) and stored therein the quantity at every one main scanning, and read out of by a timing pulse from the picture recording apparatus (b).

The picture recording apparatus ($\beta$) is, as described the above, an apparatus same as a color scanner etc. from which a picture image inputting means is eliminated, and the picture image signals output from the recording means (21) are made color correction, gradation correction and other necessary picture signal operation processing in a picture image signal processing means (22). The picture image signals processed in the picture image signal processing means (22) are fed to a recording head (24) through an exposing light control means (23) to reproduce a reproduced picture on a photosensitive material (26) on a rotational drum (25). The recording head (24) is driven by a sub-scanning feeding screw (27) and a motor (28) so that a desired scanning pitch ($\Delta L'$) may be obtained.

The scanning pitch ($\Delta L'$) corresponds to the size of the picture element of the reproduced picture, and the size is determined according to quality of desired reproduced picture. And if the size thereof is within the range in which sufficiently satisfiable quality of the reproduced picture is obtained, size is regarded as one of magnification setting factors and varied appropriately and set up in a scanning pitch setting means (29).

Values ($\Delta L'$), ($\Delta L'$) of the scanning pitches (pitch in the sub-scanning direction and that of in the scanning direction) correspond to, as mentioned the above, sizes of the picture elements to be recorded, and in the range within which no effect is given to the quality of the picture, size of the reproduced picture can be utilized as a parameter of magnification variation, however, in usual, preferable values are given as initial values to respective parameters ($\beta$), (V) and ($\tau$) etc. which have relations with decision of magnification (will be described hereinafter).

In the original picture scanning apparatus (A) shown in FIG. 1, a rotary encoder etc. (not shown) are mounted coaxial with the motor (14), and a scanning position in the sub-scanning direction is discriminated (a scanning position in the main scanning direction is discriminated by reading pulse from the CCD (1)). While in the picture image recording apparatus (B), a rotary encoder etc. (not shown) are mounted coaxial with the motor (28) and motor (31) to discriminate each of scanning positions in the sub-scanning direction and the main scanning direction.

In order to setting up magnification ($\beta$) a rotary encoder (not shown) is mounted coaxial with the motors (8) and (10) (refer to, for example, the Japanese Patent Publication No. 57-13859). These facts are well known matters and they are not objects of the present invention, so that no further description is given thereto.

Figure 2:
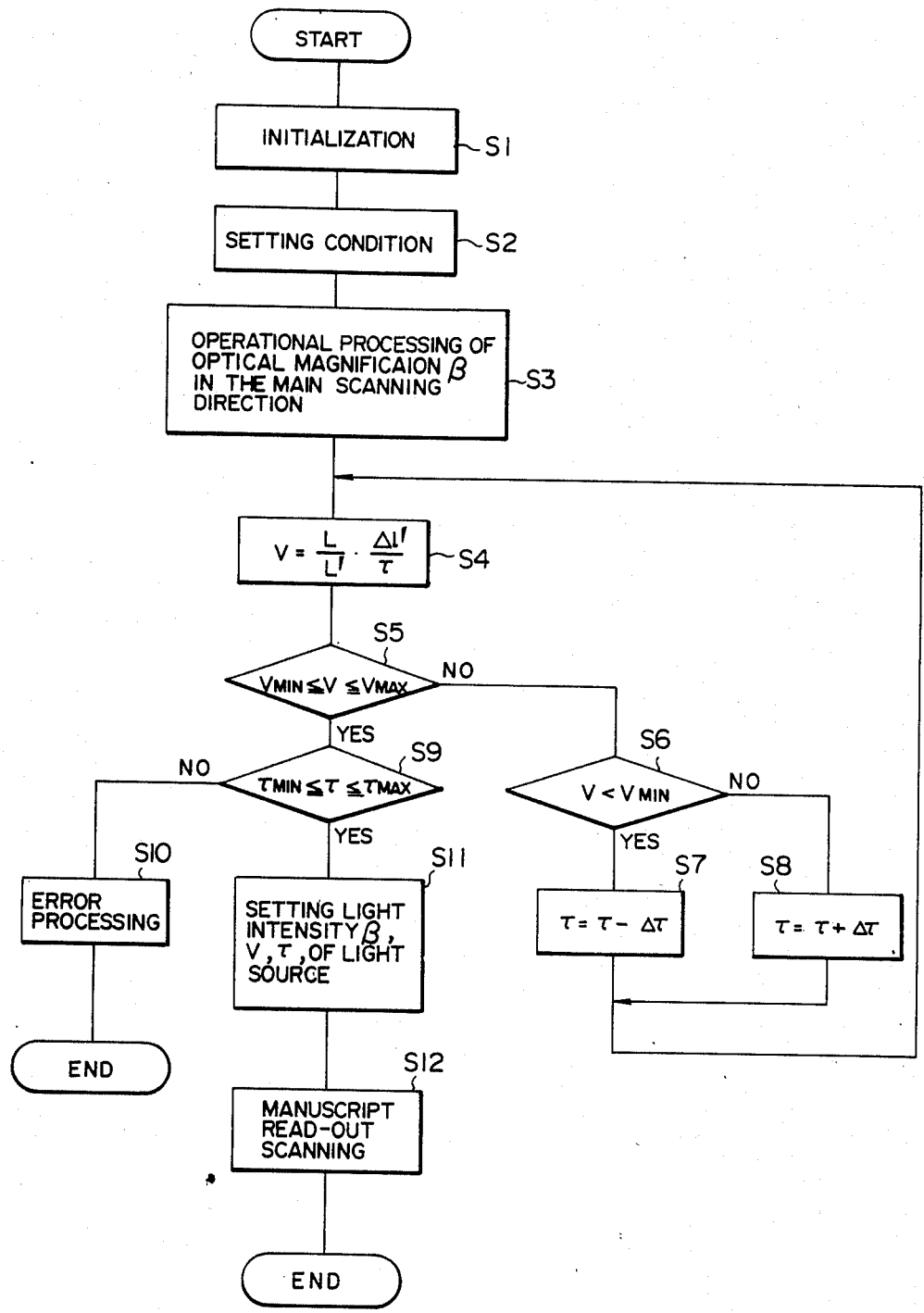
FIG. 2 is a flow chart for obtaining each of parameters for setting up magnification in the original picture scanning apparatus shown in FIG. 1.

In FIG. 2 there is shown a flow chart for determining values of each of parameters to obtain the widest range of magnification variation in the sub-scanning direction in which feeding speed (V) and scanning time ($\tau$) are taken as parameters having relations with magnification in the sub-scanning direction, and when the uppermost limit and the lowerest limit values of each of the parameters are set up.

Firstly, at step (S1) in the flow chart each of variables is initialized. Then, the initial value of the parameter ($\tau$) relating to the scanning time of the sensor (1) is preferable to be substantially the middle value between the uppermost limit value ($\tau_{MAX}$) and the lowerest limit value ($\tau_{MIN}$).

At step (S2) size (L) of the original picture, size (L') of the reproduced picture and size ($\Delta L'$) of one picture element of the reproduced picture are set up as conditions of reproduction. The setup conditions may be input in the CPU (12) shown in FIG. 1 by numerical value setting means (32),(33) and (34) such as digital switch etc., or also may be input as input data from a keyboard (35) etc.

At step (S3) the optical magnification ($\beta$) of a lens having relation with magnification in the main scanning direction is obtained by calculation. Then, if the optical magnification ($\beta$) is out of the range of permissible value, and if increasing or trimming of picture elements is permissible, the optical magnification ($\beta$) is varied to an optical magnification value within the permissible range, and picture elements are increased electrically or trimmed when the original picture, i.e., the manuscript is read out by the magnification converter (20) so that any desired sizes of reproduced pictures may be obtained.

At step (S4) the feeding speed (V) of magnification of the sub-scanning side can be obtained by applying the following formula, that is $V = L \cdot \Delta L / L' \tau$ .... (4) by calculation by the size (L) of the original picture, the size (L') of the reproduced picture, the size ($\Delta L'$) of picture element of the reproduced picture and the scanning time ($\tau$) in the main scanning direction of the sensor (1).

At step (S3) the feeding speed (V) obtained at step (S4) is judged whether it is included within a range of the permissible uppermost limit value ($V_{MAX}$) and the lowerest limit value ($V_{MIN}$) or not, and if it is within the range, i.e., YES, then it advances to step (S9) and if it is not included therein, then advances to step (S6).

At step (S6) it is discriminated whether the feeding speed (V) is smaller than the lowerest limit value ($V_{MIN}$) or not, and if it is smaller that the limit value ($V_{MIN}$), i.e., ($V < V_{MIN}$), then it advances to step (S7). This is a case of the feeding speed (V) is too late, accordingly, in this case a smaller time ($\Delta \tau$) is subtracted from the main scanning time ($\tau$) to shorten the main scanning time so as to return to step (S4), and after then calculation is again carried out so as to speeden up the feeding speed.

If in the step (S6) $V > V_{MAX}$, the feeding speed is too speedy, so that in the flow chart it advances to step (S8), where a smaller time ($\Delta \tau$) is added to the main scanning time ($\tau$) to lengthen the main scanning time and return back to step (S4) where calculation is again made to reduce the feeding speed. The feeding speed (V) which has been re-calculated at step (S4) after having been varied the main scanning time ($\tau$) is again judged whether or not the feeding speed (V) is within the uppermost limit value ($V_{MAX}$) and the lowerest limit value ($V_{MIN}$) at step (S5).

As described the above, until the feeding speed (V) comes to be included within the permissible range, that is, between the uppermost limit value ($V_{MAX}$) and the lowerest limit value ($V_{MIN}$), repeatedly the main scanning time ($\tau$) is varied to obtain the suitable feeding speed (V).

As there are some cases of the main scanning time ($\tau$) having been varied at step (S7) or (S8), at step (S9) the main scanning time ($\tau$) is judged whether or not it is included within the uppermost limit value ($\tau_{MAX}$) and the lowerest limit value ($\tau_{MIN}$), and if it is within the permissible range, then it advances to step (S11), but if not, then it advances to step (S10). at step (S10) because of the main scanning time ($\tau$) being out of the permissible range, it can not be set up, so that an error representation is given to an operator to change conditions of reproducing the picture. Thus, the whole processing are finished.

However, in the case of expanding slightly the variable magnification range in the sub-scanning direction, without conducting the error-processing at step (S10), it may be also possible to expand the variable magnification range, by varying magnification of the picture element in the sub-scanning electrically by trimming or increasing of the picture elements by means of the magnification converter (20), and further it is set up by re-calculating the feeding speed (V) so that the speed (V) and the main scanning time ($\tau$) may be included in the permissible range.

The magnification variation above described relates to a case in which the electric charge storage time ($\tau$) is fixed or changed stepwisely, while in the case of the magnification being varied, by fixing the scanning speed (V) in the sub-scanning direction or changing it stepwisely to the electric charge storage time ($\tau$) continuously, it may be satisfied by replacing (V) with ($\tau$) at those steps (S4), (S5), (S6), (S7), (S8) and (S9). At step (S11), each of the parameters such as the optical magnification ($\beta$), the feeding speed (V) and the scanning time ($\tau$) is set up to the optical magnification control means (11), the sub-scanning speed control means (15) and the main scanning speed control means (16), respectively, so that setting positions of the lens and the sensor and setting of the feeding speeds of the main and the sub-scanning directions, and controlling the feeding speed in the sub-scanning direction may be performed. Further, the optical magnification ($\beta$) and the main scanning time ($\tau$) are set to the light quantity setting means (18), and the quantity of the light source is set up to an amount so that an output level of the sensor may become a necessary amount, and in addition, since an output level of the cell is raised or lowered according to the light quantity and the main scanning time ($\tau$), the cell sensitivity setting means (19) is adjusted so that, even if the magnification has been varied, signals of the same level may be obtained.

In the case of there being necessity for electrically varying magnification by trimming and/or increasing picture elements, the magnification variating conditions are set to the magnification converter (20), and when the original picture is being read, electrically varying magnification is also performed.

The above descriptions regarding the original picture scanning apparatus (A) relates to only monochromatic color, however, of course, it is also possible to apply inventions disclosed on the Japanese Patent Application Nos. 59-81901 (No. 81901/1984) and 59-102614 (No. 102614/1984) filed by the very Applicant to the present invention to obtain a colored reproduced picture.

Nextly, the variable magnification range of the present invention is explained hereinafter.

Practical range of the electric charge storage time ($\tau$) is between 0.1 mm.sec. and 10 mm.sec., and the variable magnification range is set to be, as can be understood from the formula (5), from 1/10 to 10 times of the original picture. Nextly, the feeding speed (V) of the original picture is, as afore-mentioned, at the maximum 50 mm.sec. (10 kp/s·5 $\mu$m/p = $10 \times 10^{-2} \times 5 \times 10^{-6}$ m/s), and the minimum thereof is 5 mm/sec. (it takes 60 seconds for sub-scanning an original picture of 30 cm length.). Accordingly, in the case of $\tau = 1$ mm.sec., range of variable magnification according to the moving speed (V) becomes from 1 to 10 times from the formula (5). Further, if the electric charge storage time ($\tau$) is changed within the afore-mentioned range, the magnification variable range according to the present invention becomes from 1/10 to 100 times of the original picture. Of course, if increasing and/or trimming is applied, the variable range can be further expanded.

As minutely described heretofore, according to the present invention, by varying both the feeding speed in the sub-scanning direction and the main scanning time, within the limit values of respective factors which restrict reproduction magnification in a picture image-reproduction means, the variable magnification range can be expanded and width of variation of magnification can be minutely regulated.

Further, if an electrically varying magnification by conventionally known trimming and/or increasing of picture elements is used together with the afore-mentioned, the variable range can be highly expanded which results in widening utilization.

What is claimed is:

1. A method for controlling magnification variation comprising the steps of:
   projecting a picture image of an original on a light receiving surface of a line sensor by an optical means;
   moving said picture image projected on the light receiving surface of the line sensor in a speed-variable main scanning direction which intersects at right angles with a speed-variable sub-scanning direction in which said sensor is aligned at right angles by a feeding means; and
   controlling the variable feeding speed in both the main direction and the sub-scanning direction and controlling an electric charge storage time of said line sensor so that a reproduced picture image of a desired magnification variation may be obtained.

2. A method according to claim 1, wherein a substantially middle value between the minimum and the maximum limit values in a permissible range of said electric charge storage time ($\tau$) of said line sensor is preferentially set up, in the case of the feeding value (V) being varied for setting up and when the feeding speed (V) exceeds the uppermost limit value, the electric charge storage time ($\tau$) is varied so that the feeding value (V) may be within the range.

3. A method according to claim 1, wherein said feeding speed (V) is previously set up, and in the case of magnification being set up by varying the electric charge storage time ($\tau$) and when the electric charge storage time ($\tau$) exceeds both the limit values, the feeding speed (V) is varied so that the storage time ($\tau$) may be within the permissible range.

4. A method according to any of claims 1 to 3, wherein when magnification in the sub-scanning direction exceeds either of the uppermost or the lowerest limit values, the magnification is varied by increasing or trimming picture information on one of the main scanning lines in the sub-scanning direction.

5. A method according to any of claims 1 to 4, wherein a light quantity setup conditions on diaphragm of a lens and/or light intensity of a light source according to an optical magnification value ($\tau$) decided by size of the original picture and that of a desired reproduced picture image and the value of the electric charges storage time ($\tau$) of the line sensor.

6. The method of claim 1 wherein the feeding speed in the sub-scanning direction is adjusted first, followed by the adjustment of the feeding speed in the main scanning direction.

7. The method of claim 6 wherein the feeding speed in the sub-scanning direction may be further adjusted after adjustment of the feeding speed in the main scanning direction.

* * * * *